(12) United States Patent
Cho et al.

(10) Patent No.: US 12,325,263 B2
(45) Date of Patent: Jun. 10, 2025

(54) COMPOSITE RIM OF VEHICLE WHEEL AND METHOD OF MANUFACTURING THE SAME

(71) Applicants: Hyundai Motor Company, Seoul (KR); Kia Corporation, Seoul (KR)

(72) Inventors: Jeong Min Cho, Gyeonggi-do (KR); Chi Hoon Choi, Gyeonggi-do (KR); Young Chan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 281 days.

(21) Appl. No.: 17/843,384

(22) Filed: Jun. 17, 2022

(65) Prior Publication Data

US 2022/0314688 A1 Oct. 6, 2022

Related U.S. Application Data

(62) Division of application No. 16/179,956, filed on Nov. 4, 2018, now Pat. No. 11,383,550.

(30) Foreign Application Priority Data

May 25, 2018 (KR) .......................... 10-2018-0059377

(51) Int. Cl.
*B60B 5/02* (2006.01)

(52) U.S. Cl.
CPC .......... *B60B 5/02* (2013.01); *B60B 2310/204* (2013.01); *B60B 2310/52* (2013.01);
(Continued)

(58) Field of Classification Search
CPC . B60B 5/02; B60B 2310/204; B60B 2310/52; B60B 2360/3464;
(Continued)

(56) References Cited

U.S. PATENT DOCUMENTS 4,072,358 A 2/1978 Ridha
4,294,490 A 10/1981 Woelfel
(Continued)

FOREIGN PATENT DOCUMENTS

DE 10 2005 041 940 B4 1/2013
EP 0 326 789 A1 8/1989
(Continued)

OTHER PUBLICATIONS

Office Action issued Apr. 24, 2023 in corresponding Korean Patent Application No. 10-2018-0059377.

*Primary Examiner* — S. Behrooz Ghorishi
(74) *Attorney, Agent, or Firm* — Fox Rothschild LLP

(57) ABSTRACT

Disclosed are a composite rim of a vehicle wheel and a method of manufacturing the same, which is reduced in weight through the use of a continuous fiber composite. The rim of a vehicle wheel may be formed by stacking composite sheets, each prepared by impregnating fibers with a resin to form a sheet. The composite sheets may be stacked in multiple layers such that end portions of the respective composite sheets may contact each other in a circumferential direction of the wheel, and discontinuous interfaces, formed at the contacting end portions of the respective composite sheets along an axial direction of the wheel, may not be aligned with each other.

7 Claims, 7 Drawing Sheets

(52) U.S. Cl.
CPC . *B60B 2360/3464* (2013.01); *B60B 2360/362* (2013.01); *B60B 2900/111* (2013.01)

(58) Field of Classification Search
CPC ......... B60B 2360/362; B60B 2900/111; B60B 2360/102; B60B 2360/104; B60B 3/10; B60B 21/00; B60B 2310/242; B60B 2360/36
See application file for complete search history.

(56) References Cited

U.S. PATENT DOCUMENTS

| | | | |
|---|---|---|---|
| 4,294,639 A | 10/1981 | Woelfel et al. | |
| 4,376,749 A | 3/1983 | Woelfel | |
| 4,483,729 A | 11/1984 | Fujisaki et al. | |
| 4,532,097 A | 7/1985 | Daniels et al. | |
| 4,636,344 A | 1/1987 | McDougall | |
| 4,749,235 A | 6/1988 | McDougall | |
| 5,045,261 A * | 9/1991 | Weeks | B29C 70/345 264/108 |
| 5,277,479 A * | 1/1994 | Koyama | B60B 5/02 301/6.91 |
| 6,347,839 B1 | 2/2002 | Lew et al. | |
| 6,991,300 B2 | 1/2006 | Colegrove | |
| 2004/0021366 A1* | 2/2004 | Colegrove | B60B 5/02 301/95.101 |
| 2005/0104441 A1* | 5/2005 | Bertelson | B29C 70/345 301/64.703 |
| 2011/0101769 A1 | 5/2011 | Liao et al. | |
| 2017/0225371 A1* | 8/2017 | Thai | B29C 43/203 |

FOREIGN PATENT DOCUMENTS

| | | |
|---|---|---|
| EP | 1 353 788 B1 | 11/2005 |
| EP | 2 788 177 A1 | 10/2014 |
| EP | 2 755 862 B1 | 4/2016 |
| JP | H 06-92101 A | 4/1994 |
| JP | H 10-203101 A | 8/1998 |
| KR | 10-2010-0073714 A | 7/2010 |
| KR | 10-1194922 B1 | 10/2012 |
| KR | 10-2018-0029878 A | 3/2018 |
| KR | 10-2018-0032325 A | 3/2018 |
| KR | 10-2068831 B1 | 1/2020 |
| WO | 2013/083123 A1 | 6/2013 |
| WO | 2013/083729 A2 | 6/2013 |

* cited by examiner

COMPOSITE RIM OF VEHICLE WHEEL AND METHOD OF MANUFACTURING THE SAME

CROSS-REFERENCE TO RELATED APPLICATION

This application is a Divisional Application of U.S. application Ser. No. 16/179,956 filed on Nov. 4, 2018, which claims the priority benefit of Korean Patent Application No. 10-2018-0059377, filed on May 25, 2018 in the Korean Intellectual Property Office, the entire contents of which are incorporated herein by reference.

TECHNICAL FIELD

The present invention relates to a rim of a vehicle wheel and a method of manufacturing the same by using composite sheets comprising a fabric sheet and a resin to reduce weight of the rim.

BACKGROUND OF THE INVENTION

Generally, a driving wheel for a vehicle is an assembly of a wheel and a tire, and serves to support the weight of a vehicle, to transfer force, such as driving force and braking force, and to alleviate impacts transferred from the road surface.

For instance, the wheel serves as a support structure of the driving wheel, and therefore has been formed of steel or aluminum having good mechanical properties.

In recent years, as the demand for reduction in the weight of vehicles has continued, research into a wheel formed of a fiber-reinforced composite has been conducted with the goal of reducing the weight of a wheel formed of a metal. For instance, a spoke and a rim, which constitute the wheel, have been formed of a fiber-reinforced composite and a hybrid type in which a spoke is formed of a metal, such as steel or aluminum, and only a rim has been formed of a fiber-reinforced composite and is then coupled to the spoke.

FIG. 1 is a view illustrating a general hybrid-type wheel. As illustrated in FIG. 1, in the hybrid-type wheel 10, a spoke 20 formed of a metal and a rim 30 formed of a fiber-reinforced composite are manufactured separately, and thereafter the spoke 20 and the rim 30 are mechanically coupled to each other using a fastening member such as a bolt. The rim is formed of a fiber-reinforced composite, which is reinforced with high-rigidity and high-strength fibers, such as carbon fibers, glass fibers, or aramid fibers.

The fiber-reinforced composite, used in the rim, may be broadly divided into a discontinuous fiber-reinforced composite, a continuous fiber-reinforced composite, or a discontinuous/continuous fiber mixed reinforced composite. In the case of the discontinuous fiber-reinforced composite, the rim may be molded by compression molding or thermoplastic injection molding using a sheet molding compound (SMC).

In the case of the continuous fiber-reinforced composite, the rim may be molded by stacking prepreg and performing compression molding thereon, or by stacking layers of fabric and performing resin transfer molding (RTM) thereon. In addition, the rim may be molded by winding continuous fibers and impregnating the same with a resin.

The discontinuous fiber-reinforced composite may have low mechanical strength and rigidity, and therefore is disadvantageous from the aspect of reducing the weight of a wheel compared to the continuous fiber-reinforced composite in terms of required wheel performance.

For this reason, in the related arts, the continuous fiber-reinforced composite can be applied to reduce weight, as well as satisfying high mechanical strength and high rigidity. However, in the case in which the rim is molded using the continuous fiber-reinforced composite, the generation rate of defects, such as wrinkles, may be increased during continuous winding. Moreover, when the rim is molded by stacking layers of discontinuous fabric, problems such as difficulty in processing a cut section may continue to occur.

SUMMARY OF THE INVENTION

In preferred aspects, the present invention may provide a composite rim of a vehicle wheel and a method of manufacturing the same. The composite may solve the above-described problem, for example difficulty in processing a cut section, while satisfying all of reduced weight, high mechanical strength, and high rigidity. The composite may include a continuous fiber-reinforced composite.

In one aspect, provided is a rim of a vehicle wheel. The rim may be formed by stacking a plurality composite sheets, each prepared by impregnating continuous fibers with a resin to form a sheet.

The fibers may be, for example, naturally provided or synthetically produced substance or material that may have much greater length in one dimension by at least 10 times, at least 20 times, at least 50 times, at least 100 times, at least 200 times, at least 300 times, at least 400 times, or at least 500 times than a width or diameter thereof. The fibers may suitably provide properties related to the length direction, e.g., strength applied along the length direction of the fibers.

The resin may be, for example, a liquid, or semi-solid material that may be naturally provided or synthetically produced, and the resins may be convertible into polymers by suitably curing process, e.g., UV curing and thermal curing. The resin as used herein may suitably include synthetic resins including one or more kinds of curable monomers, which may be polymerized upon irradiation of UV or applying heat.

Each of the plurality of the composite sheets suitably may be the same or different as one or more other composite sheets. A plurality of composite sheets may suitably contain at least about 3 sheets, 5 sheets, 10 sheets, 15 sheets, 20 sheets, 25 sheets, 30 sheets, 40 sheets, 50 sheets, 60 sheets, 70 sheets, 80 sheets, 90 sheets, or 100 sheets.

The rim of a vehicle wheel may include a plurality of composite sheets and each of which may include a fabric sheet and a resin. Preferably, the resin may be impregnated in the fabric sheet. Preferably, the composite sheets may be stacked in multiple layers and the end portions of the respective composite sheets may contact each other in a circumferential direction of the wheel. Preferably, discontinuous interfaces of the respective composite sheets may be formed at the contacting the end portions of the respective composite sheets along an axial direction of the wheel and may not be aligned with each other.

The term "discontinuous interface" as used herein refers to an interface between at least two end portions of a single composite sheet (respective composite sheets), which is covering or surrounding an outer surface of a rim of a vehicle such that two end portions contacts to each other. The discontinuous interface may be formed at a portion connecting a first side of the single composite sheet and the second side of that single composite sheet.

Preferably, each of the fabric sheet may include continuous fibers.

The term "continuous fibers" as used herein refers to a bundle including long, continuous strand of fibers such that a length there is at least greater by about 100 times, 200 times, 300 times, 400 times or 500 times or more greater than the width of the diameter thereof. The continuous fibers may suitably be produced using synthetic materials, e.g., from petrochemicals or polymerizations.

The rim may include a base layer comprising one or more of the composite sheets wherein the end portions of the respective composite sheets in the base layer contact each other in the circumferential direction of the wheel and the discontinuous interfaces of the respective composite sheets in the base layer are formed at the contacting end portions of the respective composite sheets in the base layer in the axial direction of the wheel, and a reinforcement layer disposed on the base layer and comprising one or more of the composite sheets wherein the end portions of the respective composite sheets in the reinforcement layer contact each other in the circumferential direction of the wheel and the discontinuous interfaces of the respective composite sheets in the reinforcement layer are formed at the contacting end portions of the respective composite sheets in the reinforcement layer in the axial direction of the wheel. Preferably, the discontinuous interfaces formed in the base layer and the discontinuous interfaces formed in the reinforcement layer may not be aligned with each other.

The reinforcement layer may be formed in multiple layers by stacking the one or more composite sheets. The discontinuous interfaces of the respective composite sheets in the reinforcement layer may be formed at the contacting end portions of the respective composite sheets in the reinforcement layer in the axial direction of the wheel and the discontinuous interfaces of the respective composite sheets in the reinforcement layer may not aligned with each other.

The rim may include a rim body having a cylindrical shape, a rim outer portion, and a rim inner portion. The rim outer portion, and a rim inner portion may be formed both axial ends of the rim body so as to have an increased diameter. Each of the composite sheet may include a body area forming the rim body, an outer area forming the rim outer portion, and an inner area forming the rim inner portion. Preferably, the outer area and the inner area of the composite sheet may include cutting portions, which are cut in the axial direction of the wheel and are spaced apart from each other in the circumferential direction of the wheel.

The cutting portions may be spaced apart from each other by a length of an arc corresponding to an angle about a center of the rim, and the angle may be equal to or less than about 5 degrees.

Preferably, a heat-resistant resin may be impregnated in the body area of the one or more composite sheets constituting the base layer, an impact-resistant resin may be impregnated in the outer area and the inner area of the one or more composite sheets constituting the base layer, and a fatigue-resistant resin is impregnated in the one or more of the composite sheets constituting the reinforcement layer.

Further provided is a vehicle including the rim as described herein.

In another aspect of the present invention, provided is a method of manufacturing a rim of a vehicle wheel. The method may include preparing a mold corresponding to a shape of the rim, preparing a plurality of fabric sheets, stacking the respective fabric sheets in multiple layers on the prepared mold, and injecting and curing a resin into the stacked continuous fiber fabric sheets. Preferably, end proportions of the respective fabric sheets may contact each other in a circumferential direction of the mold. The discontinuous interfaces of the respective fiber fabric sheets may be formed at the contacting end portions of the respective fabric sheets along an axial direction of the mold and may not be aligned with each other.

Each of the fabric sheet may include continuous fibers and the fabric sheet may be prepared by weaving continuous fibers.

The stacking may include forming a pre-base layer by disposing one or more the respective fabric sheets on the prepared mold such that the end portions of the respective fabric sheets may contact each other in the circumferential direction of the mold and the discontinuous interfaces of the respective fiber sheets in the pre-base layer may be formed at the contacting end portions of the respective fabric sheets in the axial direction of the mold, and forming a pre-reinforcement layer by stacking the one or more of the fabric sheets on the pre-base layer such that the end portions of the of the respective fabric sheets in the pre-reinforcement layer contact each other in the circumferential direction of the mold and discontinuous interfaces of the respective fabric sheets in the pre-reinforcement layer may be formed at the contacting end portions of the respective fabric sheets in the pre-reinforcement layer in the axial direction of the mold. Preferably, the discontinuous interfaces formed in the pre-base layer and the discontinuous interfaces formed in the pre-reinforcement layer may not be aligned with each other.

In the forming the pre-reinforcement layer, the fabric sheets may be stacked in multiple layers, and the one or more fabric sheets may be stacked. The end portions of the respective fabric sheets in the pre-reinforcement layer may contact each other in the circumferential direction of the wheel and the discontinuous interfaces thereof may be formed at the contacting end portions of the respective fabric sheets in the pre-reinforcement layer in the axial direction of the wheel. The discontinuous interfaces in the pre-reinforcement layer may not be aligned with each other.

In the preparing the mold, the prepared mold may have a shape corresponding to a shape of the rim. The rim may include or be divided into a rim body having a cylindrical shape, a rim outer portion, and a rim inner portion. The rim outer portion and the rim inner portion may be formed both axial ends of the rim body so as to have an increased diameter. In the preparing the fabric sheets, each fabric sheet may include, or be divided into a body area forming the rim body, an outer area forming the rim outer portion, and an inner area forming the rim inner portion. The outer area and the inner area of the fabric sheet may include cutting portions, which may be cut in the axial direction of the mold and may be spaced apart from each other in the circumferential direction of the mold.

The cutting portions, formed in the preparing the fabric sheets, may be spaced apart from each other by a length of an arc corresponding to a predetermined angle about a center of the rim, and the predetermined angle may be equal to or less than about 5 degrees.

In the molding, the resin may be injected and cured into the stacked fabric sheets by resin transfer molding (RTM).

The method may further include preparing a plurality of resin films by molding a resin to have a film shape. Preferably, in the stacking, the fabric sheets and the resin films may be alternately stacked, and, in the molding, the fabric sheets and the resin films may be subjected to hot compression molding.

In the preparing the fabric sheets, each fabric sheet may include, or be divided into a body area forming a rim body, an outer area forming a rim outer portion, and an inner area forming a rim inner portion. Preferably, the outer area and the inner area of the fabric sheet may include cutting portions, which are cut in the axial direction of the mold and may be spaced apart from each other in the circumferential direction of the mold. Preferably, in the stacking, among resin films, with which the pre-base layer is impregnated, a heat-resistant resin film is disposed on the body area of the each of the fabric, an impact-resistant resin film is disposed on the outer area and the inner area of the each of the fabric sheet, and a fatigue-resistant resin film is impregnated in the pre-reinforcement layer.

Other aspects of the vehicle are disclosed infra.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
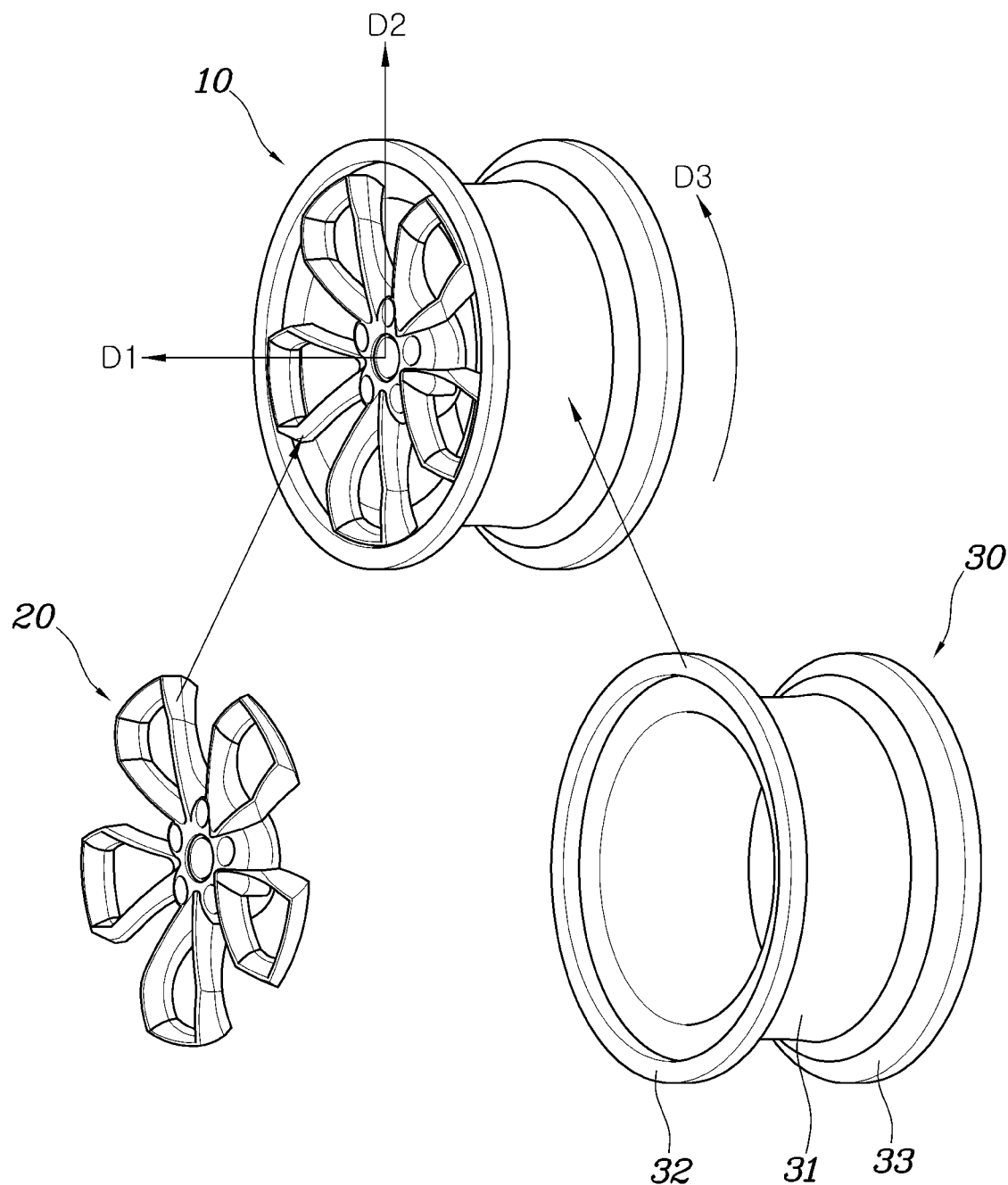
FIG. 1 is a view illustrating a conventional hybrid-type wheel in the related art.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, regions, integers, steps, operations, elements and/or components but do not preclude the presence or addition of one or more other features, regions, integers, steps, operations, elements, components, and/or combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, an exemplary embodiment of the present invention will be described in detail with reference to the accompanying drawings. The present invention, however, are not limited to the embodiments disclosed hereinafter and may be embodied in many different forms. Rather, these exemplary embodiments are provided so that this invention will be through and complete and will fully convey the scope to those skilled in the art. In the drawings, the same reference numerals denote the same elements.

Figure 2:
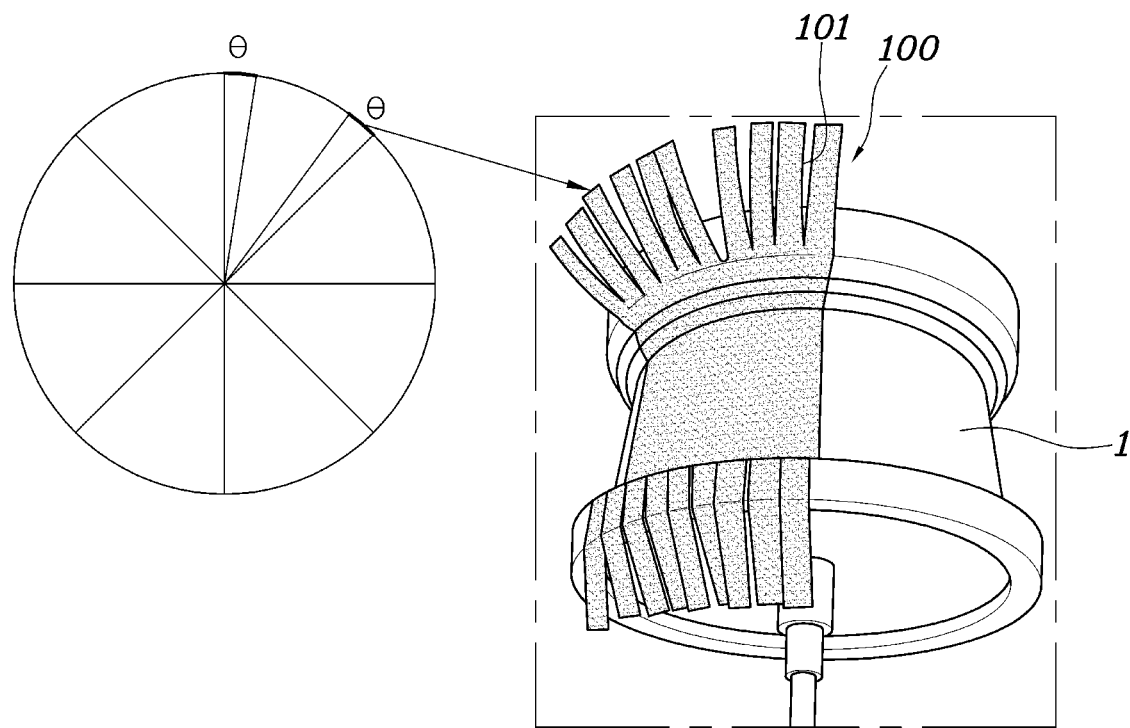
FIG. 2 is a view illustrating an exemplary method of manufacturing an exemplary composite rim of an exemplary vehicle wheel according to an exemplary embodiment of the present invention.
Figure 3:
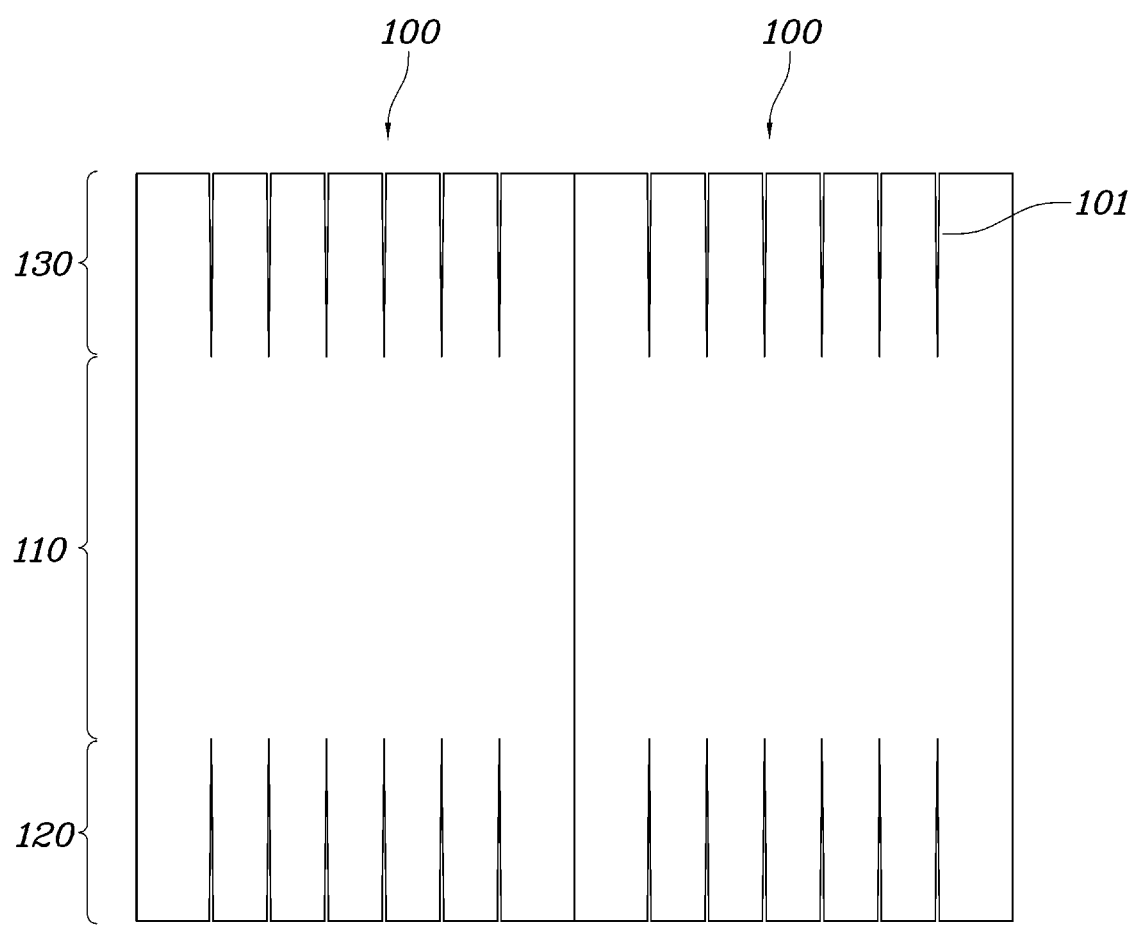
FIG. 3 is a view illustrating an exemplary composite sheet applied to an exemplary composite rim of an exemplary vehicle wheel according to an exemplary embodiment of the present invention.
Figure 4A:
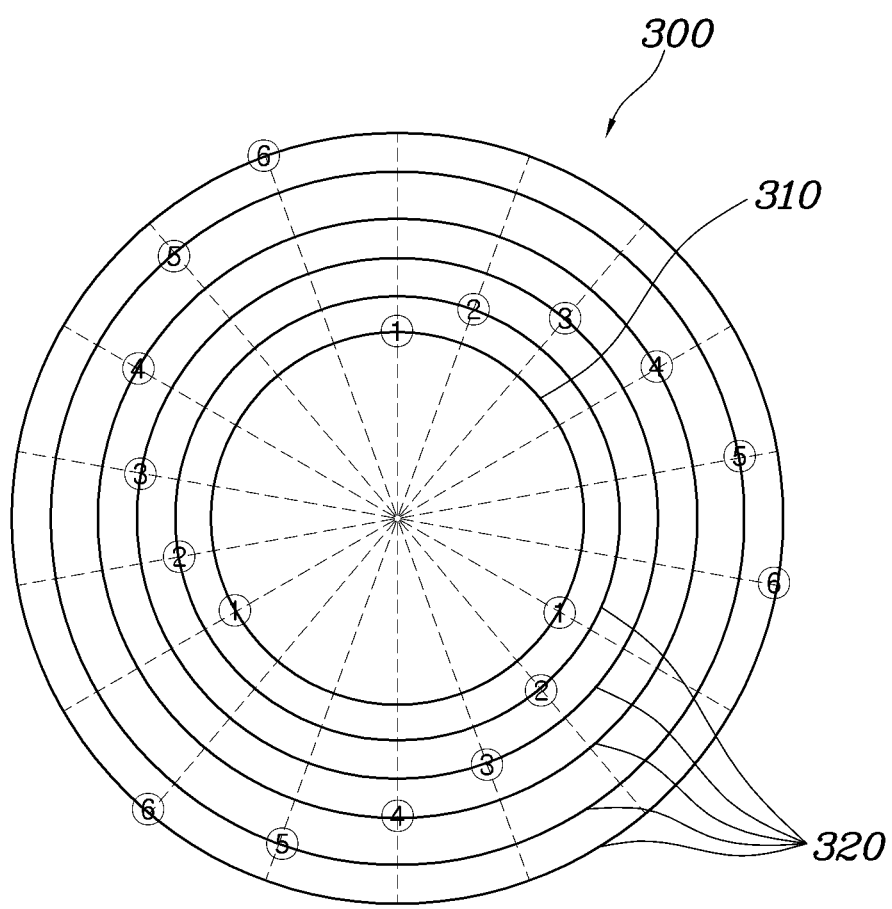
FIGS. 4A and 4B are views illustrating an example of stacking exemplary composite sheets upon the manufacture of an exemplary composite rim of an exemplary vehicle wheel according to an exemplary embodiment of the present invention.
Figure 4B:
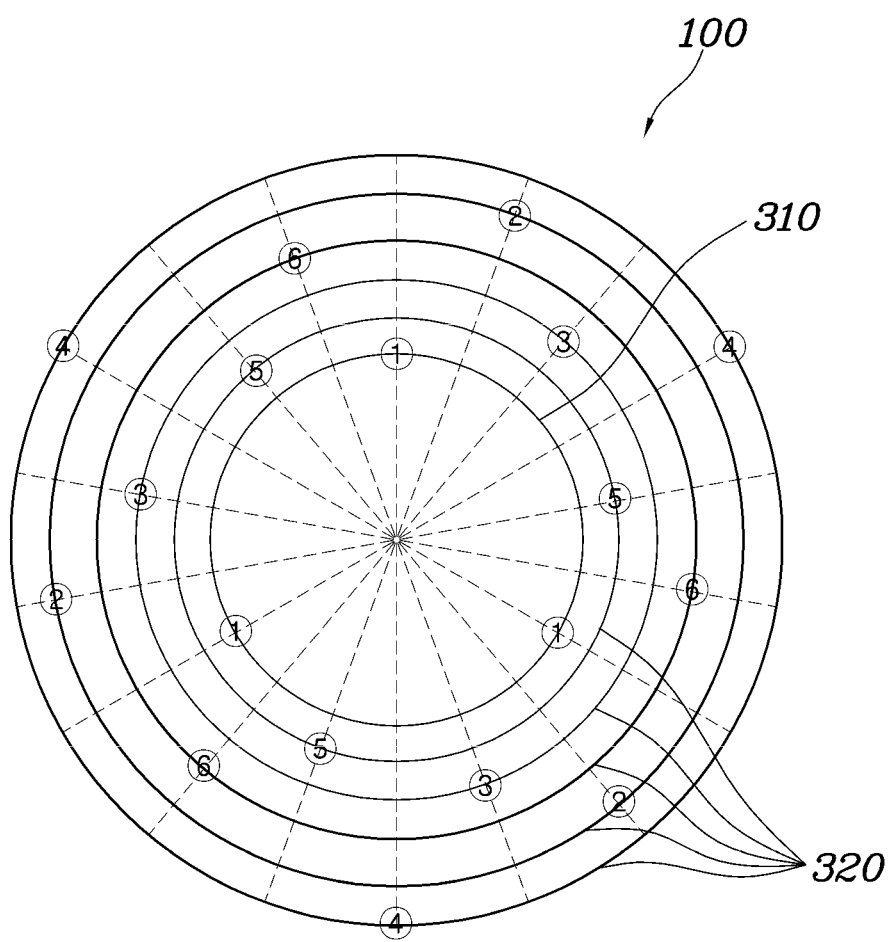
Figure 5A:
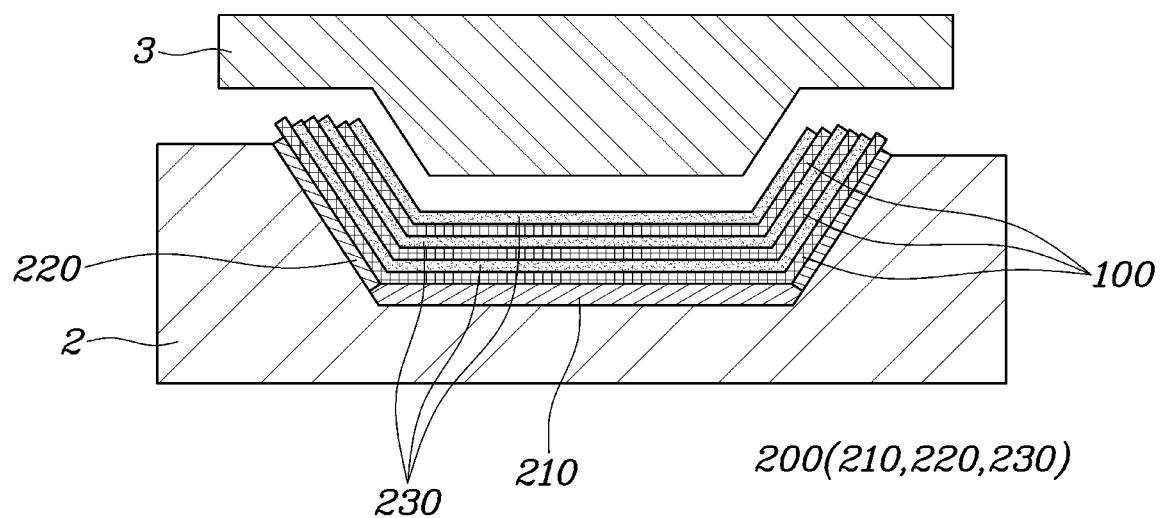
FIGS. 5A and 5B are views illustrating an exemplary method of manufacturing an exemplary rim of an exemplary vehicle wheel according to an exemplary embodiment of the present invention.
Figure 5B:
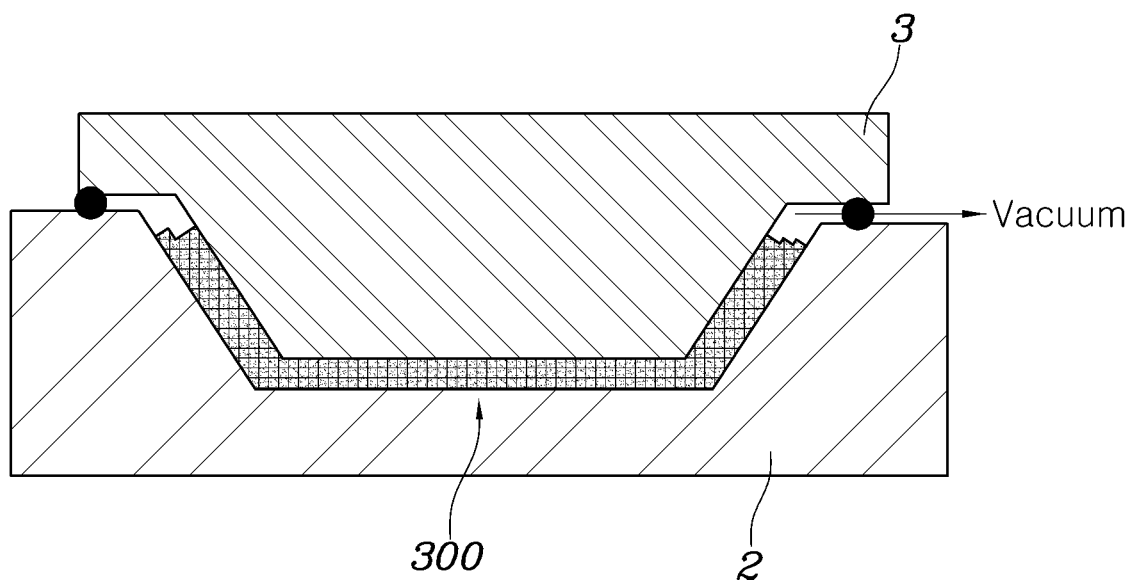

FIG. 1 is a view illustrating a convention hybrid-type wheel, FIG. 2 is a view illustrating an exemplary method of manufacturing an exemplary composite rim of an exemplary vehicle wheel according to an exemplary embodiment of the present invention, FIG. 3 is a view illustrating an exemplary composite sheet applied to the composite rim of an exemplary vehicle wheel according to v embodiment of the present invention, FIGS. 4A and 4B are views illustrating an example of stacking composite sheets upon the manufacture of an exemplary composite rim of v vehicle wheel according to an exemplary embodiment of the present invention, and FIGS. 5A and 5B are views illustrating an exemplary method of manufacturing an exemplary rim of v vehicle wheel according to an exemplary embodiment of the present invention.

The rim of the vehicle wheel according to the present invention is applied to a rim of the hybrid-type wheel 10 illustrated in FIG. 1 in which the spoke 20 is formed of a metal, such as steel, an aluminum alloy, or a magnesium alloy, and the rim 30 is formed of a fiber-reinforced composite, which is reinforced with high-rigidity and high-strength continuous fibers, such as carbon fibers, glass fibers, or aramid fibers.

The rim 30 may be a rim of a vehicle wheel, which may be formed by stacking composite sheets 100, which are prepared by impregnating continuous fibers with a resin to form a sheet. The composite sheets 100 may be stacked in multiple layers in a manner such that the end portions thereof may contact each other in the circumferential direction D3 of the wheel and such that the discontinuous interfaces thereof, which are formed at the contact regions of the respective composite sheets 100 along the axial direction D1 of the wheel, may not be aligned with each other. By arranging the discontinuous interfaces so as not to be aligned with each other, a difference in thickness and a difference in mechanical properties, which may locally occur at mutual coupling surfaces, may be prevented. Here, the composite sheet 100 may be prepared by impregnating a continuous fiber fabric sheet 100, manufactured by weaving continuous fibers, with a resin. As will be described later, the method of impregnating the continuous fiber fabric sheet 100 with the resin may be applied in various ways.

To describe the structure of the rim 30 in detail, the rim 30 may include a base layer 310 in which the respective composite sheets 100 may be disposed such that the end portions thereof may contact each other in the circumferential direction D3 of the wheel and the discontinuous interfaces thereof may be formed at the contacting regions, i.e. contacting end portions, of the respective composite sheets 100 in the axial direction D1 of the wheel, and a reinforcement layer 320 in which the composite sheets 100 may be stacked on the base layer 310 such that the ends thereof contact each other in the circumferential direction D3 of the wheel and the discontinuous interfaces thereof may be formed at the contacting regions, i.e. contacting end portions, of the respective composite sheets 100 in the axial direction D1 of the wheel. Preferably, the discontinuous interfaces formed in the base layer 310 and the discontinuous interfaces formed in the reinforcement layer 320 may not be aligned with each other.

In addition, the reinforcement layer 320 may be formed in a single layer, but may be formed in multiple layers by stacking the composite sheets 100. Preferably, the composite sheets 100, which are in the same layer, may be stacked such that the ends thereof may contact each other in the circumferential direction D3 of the wheel and the discontinuous interfaces thereof may be formed at the contact regions of the respective composite sheets 100 in the axial direction D1 of the wheel, and that the composite sheets 100, which may be in different layers, may be stacked such that the discontinuous interfaces thereof may not be aligned with each other.

The discontinuous interfaces described above may provide a consistent thickness and consistent mechanical rigidity and strength of the entire rim despite a difference in thickness between the contact regions of the rim 30 or deterioration in or concentration of mechanical rigidity and strength at the contacting regions.

As illustrated in FIG. 1, the rim 30 may be divided into a rim body 31 having a cylindrical shape, and a rim outer portion 32 and a rim inner portion 33, which may be formed by bending both axial ends of the rim body 31 so as to have an increased diameter.

For example, the rim 30 may have different diameters of respective areas thereof, the present invention provides an improvement in the shape of the composite sheets 100 to be stacked for the manufacture of the rim 30.

As shown in FIG. 3, the composite sheet 100 may include or be divided into a body area 110 forming the rim body 31, an outer area 120 forming the rim outer portion 32, and an inner area 130 forming the rim inner portion 33. The outer area 120 and the inner area 130 of the composite sheet 100 may be formed with cutting portions 101, which may be cut in the axial direction D1 of the wheel and may be spaced apart from each other in the circumferential direction D3 of the wheel. The outer area 120 and the inner area 130 may be applied to the rim outer portion 32 and the rim inner portion 33 of the rim 30, which have a diameter greater than that of the rim body 31 of the rim 30. In order to stack the composite sheets 100 on the corresponding portions, the adjacent composite sheets 100 may be stacked so as to overlap each other. When the direction in which the continuous fibers of the composite sheet 100 are arranged deviates from the axial direction D1 of the wheel by an angle greater than about 10 degrees, however, it is possible to easily stack the composite sheets 100 without the cutting portions 101 due to the characteristics of a continuous fiber fabric, and therefore, it is not necessary to form the cutting portions 101 in the composite sheets 100. Thus, the criteria for forming the cutting portions 101 in the composite sheets 100 may be set to the case in which the direction in which the continuous fibers of the composite sheet 100 has an angle equal to or less than about 10 degrees with respect to the axial direction D1 of the wheel.

The distance between the cutting portions 101, as shown in FIG. 2, may be set in a manner such that the cutting portions 101 may be spaced apart from each other by the length of an arc corresponding to an angle θ about the center of the rim 30. Thus, the angle θ may be equal to or less than about 5 degrees in consideration of a difference in diameter between the rim outer portion 32, the rim inner portion 33 and the rim body 31.

In the present invention, when the composite sheets 100 may be stacked to form the rim 30, the resin, with which the body area 110 of the composite sheet 100, which may form the base layer 310, may be impregnated, may be a heat-resistant resin. The resin, with which the outer area 120 and the inner area 130 of the composite sheet 100 may be impregnated, may be an impact-resistant resin. In addition, the resin, with which the reinforcement layer 320 may be impregnated, may be a fatigue-resistant resin. In this way, by applying the resin having good heat resistance to the innermost surface of the rim 30, deterioration in the mechanical properties of a rim portion close to a brake disc may be prevented and desired mechanical properties of the rim outer portion 32 and the rim inner portion 33 may be obtained. For example, the heat-resistant resin may suitably include a multifunctional glycidyl amine type epoxy, novolac type epoxy, or mixed epoxy thereof, and the impact-resistant resin and the fatigue-resistant resin may be a resin that may be prepared by adding rubber or polyurethane to epoxy having high brittleness so as to improve impact resistance ability and durability. However, the impact-resistant resin and the fatigue-resistant resin may be a trifunctional or bifunctional resin.

A method of manufacturing the rim configured as described above will be described.

In the method of manufacturing the rim of the vehicle wheel according to the present invention, first, molds 1, 2 and 3 having shapes corresponding to the shape of the rim 30 may be prepared (mold preparation step).

At this time, the molds 1, 2 and 3 may be prepared so as to correspond to the shape of the rim 30, which may include or be divided into the rim body 31 having a cylindrical shape and the rim outer portion 32 and the rim inner portion 33, which may be formed by bending both axial ends of the rim body 31 so as to have an increased diameter.

Subsequently, a plurality of continuous fiber fabric sheets 100 may be prepared by weaving continuous fibers (continuous fiber fabric sheet preparation step).

At this time, the continuous fiber fabric sheet 100 may have anisotropic mechanical properties including the in-plane isotropy of the rim 30. The rigidity $E_0$ of the rim 30 in the circumferential direction D3 may differ from the axial rigidity $E_{90}$, and the in-plane shear rigidity Gr of the rim 30 may be independent of the rigidity in the circumferential direction D3 and the rigidity in the axial direction D1. As such, the weaving and stacking patterns of the continuous fiber fabric sheets 100 may be implemented in various ways.

For example, various examples may be made as follows:
Example 1: [±θ], [0/90]
Example 2: [±θ/0/±θ], [+θ/0/−θ], [±θ/90/±θ], [+θ/90/−θ]
Example 3: [±θ/0/90/±θ], [+θ/0/90/−θ]

Unit patterns, such as the weaving and stacking patterns of Example 1 to Example 3 described above, may be repeatedly stacked. The weaving and stacking patterns of the continuous fiber fabric sheets 100 may not be limited to the proposed examples, and may be modified and implemented in various ways.

In addition, the continuous fiber fabric sheet 100 may have a width capable of covering the overall rim width, or may take the form of a narrow strip for local application. For example, in the case of a 0-degree unidirectional (UD) fabric, the continuous fiber fabric sheet 100 may take the form of a narrow strip since it is necessary to apply pieces of fabric having different lengths for each area according to variation in the diameter in the axial direction D1 of the rim 30.

The continuous fiber fabric sheet 100, as illustrated in FIG. 3, may include or be divided into the body area 110 forming the rim body 31, the outer area 120 forming the rim outer portion 32, and the inner area 130 forming the rim inner portion 33. Preferably, the outer area 120 and the inner area 130 of the continuous fiber fabric sheet 100 may be formed with the cutting portions 101, which may be cut in the axial direction D1 of the mold and may be spaced apart from each other in the circumferential direction D3 of the mold.

Then, the continuous fiber fabric sheets 100 may be stacked on the prepared mold (stacking step). In the stacking step, the continuous fiber fabric sheets 100 may be stacked in multiple layers on the prepared mold such that the ends thereof may contact each other in the circumferential direction of the mold and such that the discontinuous interfaces thereof, which may be formed at the contact regions of the respective composite sheets 100 along the axial direction of the mold, may not be aligned with each other.

At this time, the stacking step may include a pre-base layer forming process of forming a pre-base layer 310 in which the continuous fiber fabric sheets 100 may be disposed on the prepared mold such that the ends thereof may contact each other in the circumferential direction D3 of the mold and such that the discontinuous interfaces thereof may be formed at the contact regions of the respective c continuous fiber fabric sheets 100 in the axial direction D1 of the mold and a pre-reinforcement layer forming process of forming a pre-reinforcement layer 320 in which the continuous fiber fabric sheets 100 may be stacked on the pre-base layer 310 such that the ends thereof may contact each other in the circumferential direction of the mold and such that the discontinuous interfaces thereof may be formed at the contacting regions of the respective continuous fiber fabric sheets 100 in the axial direction of the mold so as not to be aligned with the discontinuous interfaces formed in the pre-base layer 310.

In addition, in the pre-reinforcement layer forming process, the continuous fiber fabric sheets 100 may be stacked in multiple layers in a manner such that the ends of the continuous fiber fabric sheets 100 in the same layer may contact each other in the circumferential direction D3 of the mold and the discontinuous interfaces thereof may be formed at the contact regions of the respective continuous fiber fabric sheets 100 in the axial direction D1 of the mold and such that the discontinuous interfaces formed by the continuous fiber fabric sheets 100 in different layers may not be aligned with each other.

The arrangement and stacking of the continuous fiber fabric sheets 100 may be applied in various ways so long as the discontinuous interfaces of the respective continuous fiber fabric sheets 100 may not be aligned with each other.

For example, as illustrated in FIGS. 4A and 4B, when the pre-base layer 310 and the pre-reinforcement layer 320 may be formed, the discontinuous interfaces ①, ②, ③, ④, ⑤ and ⑥ formed in different layers may be disposed so as not to be aligned with each other. Here, the discontinuous interfaces ①, ②, ③, ④, ⑤ and ⑥ may be disposed in a regular pattern, as illustrated in FIG. 4A, or may be disposed in an irregular pattern, as illustrated in FIG. 4B.

After the continuous fiber fabric sheets 100 are stacked, a resin may be injected and cured into the stacked continuous fiber fabric sheets 100 (molding step).

The molding step may be implemented in various ways. For example, a resin may be injected and cured into the stacked continuous fiber fabric sheets 100 by a resin transfer molding (RTM) method.

In addition, as illustrated in FIGS. 5A and 5B, after preparing a plurality of resin films 200 by molding a resin to have a film form (resin film preparation step), the continuous fiber fabric sheets 100 and the resin films 200 may be alternately stacked in the stacking step, and the fabric sheets 100 and the resin films 200 may be subjected to hot compression molding using the molds 2 and 3 to manufacture a molded article 300 in the molding step.

When the resin films 200 are applied as described above, among the resin films 200, with which the pre-base layer 310 is impregnated, the resin film 210 disposed on the body area of the continuous fiber fabric sheet 100 may be a heat-resistant resin film, and the resin film 220 disposed on the outer area and the inner area of the continuous fiber fabric sheet 100 may be an impact-resistant resin film. In addition, the resin film 230, with which the pre-reinforcement layer 320 is impregnated, may be a fatigue-resistant resin film.

As the resin is injected and cured into the stacked continuous fiber fabric sheets 100 by a resin transfer molding (RTM) method, the respective areas of the continuous fiber fabric sheet 100 may be impregnated with the heat-resistant resin, the impact-resistant resin, and the fatigue-resistant resin so as to provide a rim that includes different types of resins for each area.

In the present invention, for the clarity of description, the state in which the continuous fiber fabric sheet 100 is impregnated with a resin has been designated and described as a composite sheet. Thus, the continuous fiber fabric sheet and the composite sheet are denoted by the same reference numeral 100. In addition, the pre-base layer formed of the continuous fiber fabric sheet and the base layer formed of the composite sheet are denoted by the same reference numeral 310, and the pre-reinforcement layer formed of the continuous fiber fabric sheet and the reinforcement layer formed of the composite sheet are denoted by the same reference numeral 320.

In various exemplary embodiments of the present invention, a discontinuous fabric may be formed using continuous fibers, and a plurality of layers of fabric may be stacked so as to contact each other in the circumferential direction of a wheel, such that a rim of a vehicle wheel capable of satisfying reduced weight, high mechanical rigidity, and high strength through the use of continuous fibers may be manufactured.

In addition, the layers of discontinuous fabric may contact each other such that discontinuous interfaces thereof are not aligned with each other, such that it is possible to prevent a problem of the related art in which a rim is manufactured by stacking layers of discontinuous fabric so that ends thereof overlap each other, thus having difficulty in realizing consistent mechanical strength and rigidity for each area.

In addition, by applying a resin having good heat resistance to the innermost surface of the rim to which heat generated in a brake disc is transferred, deterioration in the mechanical properties of a rim portion that is close to the brake disc may be prevented.

Although the various exemplary embodiments of the present invention have been described above with reference to the accompanying drawings, those skilled in the art will appreciate that the present invention can be implemented in various other embodiments without changing the technical ideas or features thereof.

What is claimed is:

1. A method of manufacturing a rim of a vehicle wheel, the method comprising:
   preparing a mold corresponding to a shape of the rim;
   preparing a plurality of fabric sheets;
   stacking the respective fabric sheets in multiple layers on the prepared mold such that entire end portions of the respective fabric sheets contact each other in a circumferential direction of the mold, discontinuous interfaces of the respective fiber fabric sheets are formed at the contacting entire end portions of the respective fabric sheets and along an axial direction of the mold,
   wherein the discontinuous interfaces of the respective fiber fabric sheets are not aligned with each other; and
   injecting and curing a resin into the stacked fiber fabric sheets;
   wherein the stacking comprises:
      forming a pre-base layer by disposing one or more of the fabric sheets on the prepared mold such that the entire end portions of the respective fabric sheets contact each other in the circumferential direction of the mold and the discontinuous interfaces of the respective fiber sheets in the pre-base layer are formed at the contacting entire end portions of the respective fabric sheets in the pre-base layer in the axial direction of the mold; and
      forming a pre-reinforcement layer by stacking one or more of the fabric sheets on the pre-base layer such that the entire end portions of the respective fabric sheets in the pre-reinforcement layer contact each other in the circumferential direction of the mold and discontinuous interfaces of the respective fiber sheets in the pre-reinforcement layer are formed at the contacting end portions of the respective fabric sheets in the pre-reinforcement layer in the axial direction of the mold,
      wherein the discontinuous interfaces formed in the pre-base layer and the discontinuous interfaces formed in the pre-reinforcement layer are not aligned with each other; and
      wherein, in the forming of the pre-reinforcement layer, the fabric sheets are stacked in multiple layers, the one or more fabric sheets are stacked such that the entire end portions of the respective fabric sheets in the pre-reinforcement layer contact each other in the circumferential direction of the wheel and the discontinuous interfaces of the respective fabric sheets in the pre-reinforcement layer are formed at the contacting entire end portions of the respective fabric sheets in the pre-reinforcement layer in the axial direction of the wheel, and the discontinuous interfaces of the respective fabric sheets in the pre-reinforcement layer are not aligned with each other.

2. The method according to claim 1, wherein each of the fabric sheet comprises continuous fibers.

3. The method according to claim 1, wherein, in the preparing the mold, the prepared mold has a shape corresponding to a shape of the rim, wherein the rim comprises a rim body having a cylindrical shape, a rim outer portion, and a rim inner portion, wherein the rim outer portion and the rim inner portion are formed at both axial ends of the rim body so as to have an increased diameter, and
   wherein, in the preparing the fabric sheets, each of the fabric sheets comprises a body area forming the rim body, an outer area forming the rim outer portion, and an inner area forming the rim inner portion, and the outer area and the inner area of each of the fabric sheets comprises cutting portions, which are cut in the axial direction of the mold and are spaced apart from each other in the circumferential direction of the mold.

4. The method according to claim 3, wherein the cutting portions are spaced apart from each other by a length of an arc corresponding to an angle about a center of the rim, and the angle is equal to or less than about 5 degrees.

5. The method according to claim 1, wherein, in the molding, the resin is injected and cured into the stacked fabric sheets by resin transfer molding (RTM).

6. The method according to claim 1, further comprising preparing a plurality of resin films by molding a resin to have a film shape,
   wherein, in the stacking, the fabric sheets and the resin films are alternately stacked, and
   wherein, in the molding, the fabric sheets and the resin films are subjected to hot compression molding.

7. The method according to claim 6, wherein, in the preparing the fabric sheets, each of the fabric sheet comprises a body area forming a rim body, an outer area forming a rim outer portion, and an inner area forming a rim inner portion, and the outer area and the inner area of the fabric sheet are formed with cutting portions, which are cut in the axial direction of the mold and are spaced apart from each other in the circumferential direction of the mold, and
   wherein, in the stacking, a heat-resistant resin film is disposed on the body area of the each of the fabric, an impact-resistant resin film is disposed on the outer area and the inner area of the each of the fabric sheet, and a fatigue-resistant resin film is impregnated in the pre-reinforcement layer.

* * * * *